(No Model.)
W. F. TORREY.
CAMERA SHUTTER.
No. 498,963. Patented June 6, 1893.
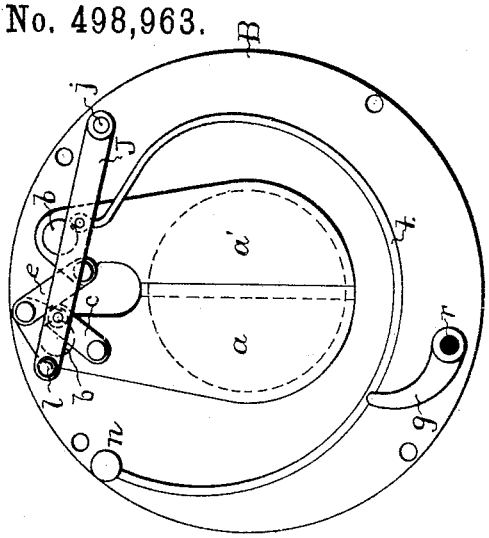
Fig. 2.
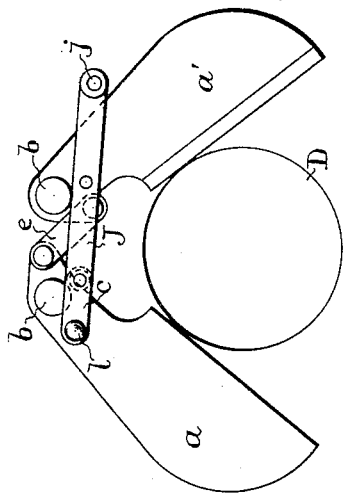
Fig. 3.
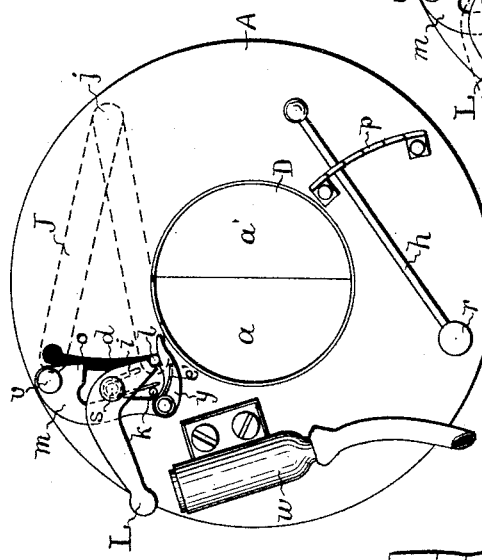
Fig. 1.
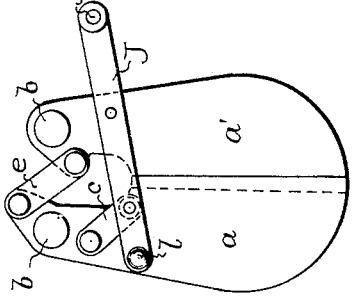
Fig. 4.
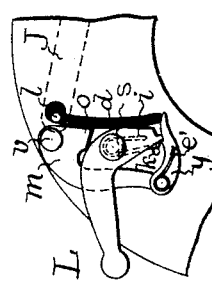
Fig. 6.
WITNESSES:
Frank A. Foster
E. B. Read
INVENTOR
William F. Torrey
BY
Benj. Arnold
ATTORNEY

UNITED STATES PATENT OFFICE.

WILLIAM F. TORREY, OF PROVIDENCE, RHODE ISLAND.

CAMERA-SHUTTER.

SPECIFICATION forming part of Letters Patent No. 498,963, dated June 6, 1893.

Application filed December 30, 1892. Serial No. 456,763. (No model.)

*To all whom it may concern:*

Be it known that I, WILLIAM F. TORREY, of Providence, in the county of Providence and State of Rhode Island, have invented certain new and useful Improvements in Camera-Shutters; and I do hereby declare that the following is a full, clear, and exact description thereof, reference being had to the accompanying drawings, and to the letters of reference marked thereon, which form a part of this specification.

This invention relates to the construction and operation of shutters for photograph cameras and is intended to combine the advantages of the time and instantaneous operations in one simple arrangement of devices. It is fully illustrated in the accompanying drawings.

Figure 1, is a front elevation of the shutter case as it appears when attached to a camera for use. Fig. 2, shows the inside of the case with the shutter wings and devices for operating them, the front plate of the case being removed. Fig. 3, is a diagram representing the shutter wings open, and the position of the controlling bar. Fig. 4, is a diagram showing the shutter wings closed with the controlling bar in the other position from that seen in Fig. 2. Figs. 5, and 6, represent details of the detaining devices for keeping the wings open or closed. Fig. 7 shows a section of the wings across the center of the opening.

The case that holds the parts of the shutter and devices for operating them, is composed of a front plate A, having a flange up around it of proper width, and a back plate B, attached to the front plate by means of screws passing through holes in the back plate and screwing into blocks in the front plate. An opening D is made through the center of both plates A B. The shutter is of that class that are divided into two wings opening from the center outward and rabbeted at their edges where they meet see Fig. 7, so that they may overlap and make a close joint. The shutter wings $a\ a'$ are made in a semicircular shape having extensions at one side by which they are pivoted at $b\ b$ to the back plate B to swing freely, and are connected together by a link $e$, which is pivoted at one end to the wing $a$ outside its pivot $b$, and at the other end to the wing $a'$ inside of its pivot $b$, so that when one wing is opened, the other will be, as seen in Fig. 3. A bar J is also pivoted to the back plate B at $j$, and has in its other end a pin $l$ that projects through a slot $d$ in the front plate A to operate the bar by. The bar J is connected to one of the wings $a$ by a link $c$, one end of the link being pivoted to the wing and the other end to the bar at such a distance apart that when the bar and link are in line with each other the wings will be wide open as in Fig. 3, and when the bar is swung either up as in Fig. 2, or down as in Fig. 4, the wings $a\ a'$ will be closed. A spring $t$ is held at one end in a stud $n$ in the back plate and the other end of the spring is pivoted to or made to bear against the bar J and press it upward when it is free to move. A stud $r$ is put through the front plate A and has an arm $g$ attached to its inner end arranged to bear on the spring $t$, and an arm $h$ fast in its outer end by which the stud $r$ can be turned and the arm $g$ made to press more or less on the spring $t$ to increase or lessen the quickness of motion of the bar J outward. A notched rack $p$ is attached to the face of plate A near the end of the arm $h$ to receive the arm in its notches and hold it as it may be set.

As before stated the pin $l$ in bar J extends out through a slot $d$ in the front plate A for the purpose of moving the bar J from the outside, and a knee lever L is pivoted at $s$ to the front plate A so that when the long arm of the lever L is down the short end will extend over the slot $d$, in which position the lever is held by a light spiral spring $i$, placed around the pivot $s$ with one end fast in the plate A and the other turned up through a hole in the lever L. A catch $m$ is pivoted to the plate A at $v$ and extends down under the lever L. This catch $m$ has a tongue $y$ pivoted to its free end, and a spiral spring $e$ held around the pivot has one end attached to the tongue to throw it up at a right angle to the catch $m$. A shoulder is made on the catch $m$ at $o$, which projects over the slot $d$ when the catch is pushed to the right.

The operation is as follows: The normal position of the bar J is up, as seen in Fig. 2, and the wings $a\ a'$ are closed. To set the shutter to open or close instantaneously, the catch m is pushed back to the left so that the tongue y will not project over the slot d, and the bar J is then moved into the position in Fig. 4 by the pin l, which will catch under the end of the short arm of lever L and be held there, as in Fig. 1, with the wings closed. To give the exposure the long arm of the lever L is raised either by the piston of the pneumatic cylinder W, or by the fingers direct, and the short arm of that lever will be withdrawn from over the pin l and allow the spring t to throw the lever J to its upper position again, opening and closing the wings as the lever passes by its horizontal position seen in Fig. 3. This gives an instantaneous opening and closing of the wings governed by the pressure put on the lever spring t shown by the arms g and h. To make a time exposure the lever and other parts are set with the pin l down in the slot d, as before described for the instantaneous exposure, except that the catch m is pushed to the right so as to bring the tongue y across the slot d, when the pin l will hold it down free from contact with the end of the lever L, as in Fig. 1, with the shoulder o of the catch m projecting over the slot d. Then, as the outer end of the lever L is again raised, the pin l will be set free to move up the slot, but it will be caught on the shoulder o, Fig. 1, in which position the bar J will be horizontal and the wings open as in Fig. 3, to remain in that position until the long arm of the lever L, is again lifted when the tongue y having been left free, by the escape of pin l, to be pushed up against the short end of the lever L by the spring e, the second motion of the short end of the lever L, will throw back the catch m, Fig. 6, and allow the pin l to go from the shoulder o, where it stopped to the upper end of the slot d and close the wings a a' again, as in Fig. 2. the time of exposure or the time the wings remain open being the time that elapses between the two impulses given to the lever L, as described.

The pneumatic arrangement is not described as it is a well known device and is not essential in this case, for the lever L can be operated by fingers or by pulling a string attached to the lever. A stationary pin k, fast in the plate A, limits the motion of the catch m, and the lever L, to the extent desired.

Having thus described my improvements, I claim as my invention—

1. In a camera shutter, the combination with the case, of the two wings connected together by a link, one end of which is fastened to one wing outside of its pivot, and its other end secured to the other wing inside of its pivot, a swinging cross-bar pivoted to the case and connected to one of said wings, and having a pin fast in its free end with devices for catching and releasing the pin at different positions of the cross-bar, substantially as described.

2. In a camera shutter, the combination with the case, of the two wings connected together by a link, one end of which is fastened to one wing outside of its pivot, and its other end secured to the other wing, inside of its pivot, a swinging cross-bar pivoted to the case, and connected to one of said wings, and having a pin fast in its free end, a catch also pivoted to said case, having a shoulder arranged to catch said pin in the cross-bar, midway of its motion, to hold the wings apart, and a tongue attached to the end of said catch, with a spring to hold it in one direction, substantially as described.

3. In a camera shutter, the combination with a case, of two wings swinging on pivots fast in said case, and connected together by a link having one end fast to one of the wings outside of its pivot, and the other end fastened to the other wing, inside of its pivot, a swinging cross-bar pivoted to said case and connected to one of the wings, a spring fast at one end to a stud in the case, and arranged to press the cross-bar over in one direction, a stud in said case, with an arm fast on one end arranged to bear on said spring, a bar in the other end of the stud, to turn said stud and arm by, and a notched bar to receive said bar and hold it, substantially as described.

In testimony whereof I hereunto affix my signature in the presence of two witnesses.

WILLIAM F. TORREY.

Witnesses:
BENJ. ARNOLD,
E. B. READ.